United States Patent
Chiba et al.

(10) Patent No.: US 11,405,355 B2
(45) Date of Patent: Aug. 2, 2022

(54) IDENTIFICATION DEVICE, IDENTIFICATION METHOD, AND IDENTIFICATION PROGRAM

(71) Applicant: NIPPON TELEGRAPH AND TELEPHONE CORPORATION, Tokyo (JP)

(72) Inventors: Daiki Chiba, Musashino (JP); Mitsuaki Akiyama, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/258,173

(22) PCT Filed: Apr. 16, 2019

(86) PCT No.: PCT/JP2019/016345
§ 371 (c)(1),
(2) Date: Jan. 6, 2021

(87) PCT Pub. No.: WO2020/012747
PCT Pub. Date: Jan. 16, 2020

(65) Prior Publication Data
US 2021/0281540 A1    Sep. 9, 2021

(30) Foreign Application Priority Data
Jul. 12, 2018    (JP) .............................. JP2018-132725

(51) Int. Cl.
*G06F 13/00*    (2006.01)
*H04L 61/5007*    (2022.01)
(Continued)

(52) U.S. Cl.
CPC ...... *H04L 61/2007* (2013.01); *H04L 61/1511* (2013.01); *H04L 61/6004* (2013.01); *H04L 61/6095* (2013.01)

(58) Field of Classification Search
CPC ............. H04L 61/2007; H04L 61/1511; H04L 61/6004; H04L 61/6095; H04L 61/2061
(Continued)

(56) References Cited

U.S. PATENT DOCUMENTS 8,856,360 B2 * 10/2014 Achan ................. H04L 63/1408
                                                      709/228
9,245,121 B1 *  1/2016 Luo ........................ H04L 63/14
(Continued)

OTHER PUBLICATIONS

Xie et al., "How Dynamic are IP Addresses?", SIGCOMM'07 Proceedings of the 2007 conference on Applications, technologies, architectures and protocols for computer communications, Aug. 27-31, 2007, pp. 301-312.
(Continued)

*Primary Examiner* — Kenneth R Coulter
(74) *Attorney, Agent, or Firm* — Xsensus LLP

(57) ABSTRACT

An identification device specifies a boundary which divides rows of IP addresses, which are included in an IP address block and sorted in a predetermined order, into a plurality of parts based on AS numbers, e2LDs, PTR records, etc. of the IP addresses. When the number of the IP addresses included in the part divided by the boundary is equal to or more than a parameter N, which can be arbitrarily set, an identification unit identifies the IP addresses included in the part as dynamic IP addresses.

11 Claims, 8 Drawing Sheets

(51) Int. Cl.
*H04L 61/4511* (2022.01)
*H04L 101/604* (2022.01)
*H04L 101/695* (2022.01)

(58) Field of Classification Search
USPC .................................................. 709/245, 203
See application file for complete search history.

(56) References Cited

U.S. PATENT DOCUMENTS

| | | | | |
|---|---|---|---|---|
| 9,338,254 | B2* | 5/2016 | Rewaskar | ........... H04L 67/1002 |
| 10,116,735 | B2* | 10/2018 | Rewaskar | ............... H04L 67/34 |
| 2008/0320119 | A1 | 12/2008 | Achan et al. | |
| 2014/0195687 | A1* | 7/2014 | Rewaskar | ........... H04L 61/2076 |
| | | | | 709/226 |
| 2016/0294930 | A1* | 10/2016 | Rewaskar | ........... H04L 61/2076 |

OTHER PUBLICATIONS

Richter et al., "Beyond Counting: New Perspectives on the Active IPv4 Address Space", IMC '16 Proceedings of the 2016 Internet Measurement Conference, Nov. 14-16, 2016, pp. 135-149.

Jin et al., "Identifying Dynamic IP Address Blocks Serendipitously through Background Scanning Traffic" CoNEXT 07 Proceedings of the 2007 ACM CoNEXT conference, Dec. 10-13, 2007, 12 pages.

Cai et al., "Understanding Block-level Address Usage in the Visible Internet", SIGCOMM'10 Proceedings of the ACM SIGCOMM 2010 Conference, Aug. 30-Sep. 3, 2010, pp. 99-110.

Extended European search report dated Feb. 2, 2022, in corresponding European patent Application No. 19833282.7, 8 pages.

Nakamori et al., "Detecting Dynamic IP Addresses and Cloud Blocks Using the Sequential Characteristics of PTR Records", Journal of information Processing, vol. 27, pp. 525-535, total 12 pages, Sep. 2019, XP055882132, DOI: 10.2197 iipsjjip.27.525.

* cited by examiner

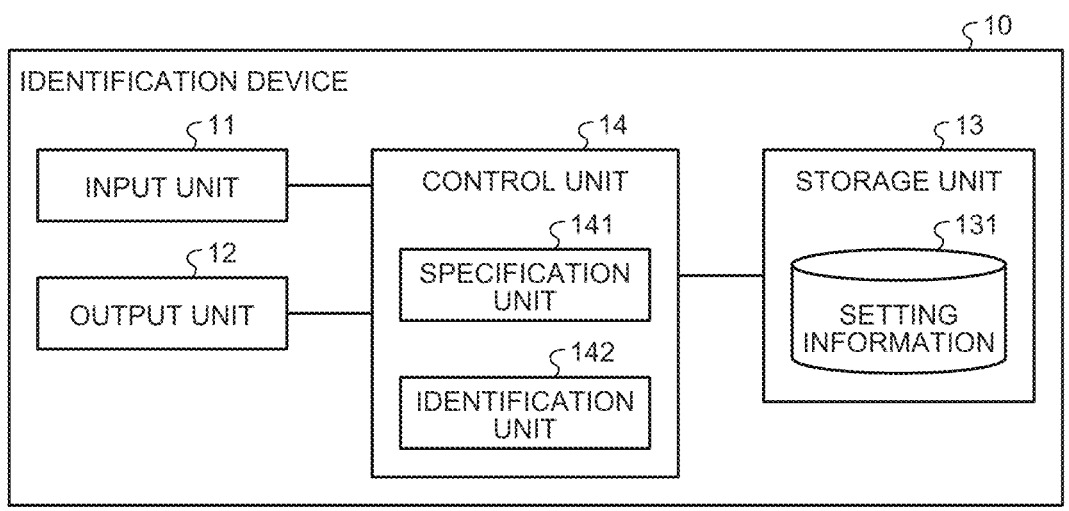

FIG.3

| SERIAL NUMBER | IP ADDRESS | AS NUMBER | PTR RECORD | e2LD | ... |
|---|---|---|---|---|---|
| 1 | 192.0.2.1 | AS64496 | host1.example.net | example.net | ... |
| 2 | 192.0.2.2 | AS64496 | host2.example.net | example.net | ... |
| ... | ... | ... | ... | ... | ... |
| 20 | 192.0.2.20 | AS64496 | host20.example.net | example.net | ... |
| 21 | 192.0.2.21 | AS64496 | test21.example.com | example.com | ... |
| 22 | 192.0.2.22 | AS64496 | test22.example.com | example.com | ... |
| 23 | 192.0.2.23 | AS64496 | test23.example.com | example.com | ... |
| 24 | 192.0.2.24 | AS64496 | test24.example.com | example.com | ... |
| 25 | 192.0.2.25 | AS64496 | test25.example.com | example.com | ... |
| 26 | 192.0.2.26 | AS64496 | www.example.com | example.com | ... |
| 27 | 192.0.2.27 | AS64496 | mail.example.com | example.com | ... |
| 28 | 192.0.2.28 | AS64496 | ftp.example.com | example.com | ... |
| 29 | 192.0.2.29 | AS64496 | test29.example.com | example.com | ... |
| ... | ... | ... | ... | ... | ... |
| 128 | 192.0.2.128 | AS64496 | test128.example.com | example.com | ... |
| 129 | 192.0.2.129 | AS64497 | foo129.example.org | example.org | ... |
| ... | ... | ... | ... | ... | ... |

| SERIAL NUMBER | IP ADDRESS | AS NUMBER | PTR RECORD | e2LD | DIVISION FOCUSING ON MANAGEMENT BOUNDARY |
|---|---|---|---|---|---|
| 1 | 192.0.2.1 | AS64496 | host1.example.net | example.net | SEGMENT 1-1 |
| 2 | 192.0.2.2 | AS64496 | host2.example.net | example.net | SEGMENT 1-1 |
| ⋮ | ⋮ | ⋮ | ⋮ | ⋮ | ⋮ |
| 20 | 192.0.2.20 | AS64496 | host20.example.net | example.net | SEGMENT 1-1 |
| 21 | 192.0.2.21 | AS64496 | test21.example.com | example.com | SEGMENT 1-2 |
| 22 | 192.0.2.22 | AS64496 | test22.example.com | example.com | SEGMENT 1-2 |
| 23 | 192.0.2.23 | AS64496 | test23.example.com | example.com | SEGMENT 1-2 |
| 24 | 192.0.2.24 | AS64496 | test24.example.com | example.com | SEGMENT 1-2 |
| 25 | 192.0.2.25 | AS64496 | test25.example.com | example.com | SEGMENT 1-2 |
| 26 | 192.0.2.26 | AS64496 | www.example.com | example.com | SEGMENT 1-2 |
| 27 | 192.0.2.27 | AS64496 | mail.example.com | example.com | SEGMENT 1-2 |
| 28 | 192.0.2.28 | AS64496 | ftp.example.com | example.com | SEGMENT 1-2 |
| 29 | 192.0.2.29 | AS64496 | test29.example.com | example.com | SEGMENT 1-2 |
| ⋮ | ⋮ | ⋮ | ⋮ | ⋮ | ⋮ |
| 128 | 192.0.2.128 | AS64496 | test128.example.com | example.com | SEGMENT 1-2 |
| 129 | 192.0.2.129 | AS64497 | foo129.example.org | example.org | SEGMENT 2 |
| ⋮ | ⋮ | ⋮ | ⋮ | ⋮ | ⋮ |

FIG.7

| SERIAL NUMBER | IP ADDRESS | AS NUMBER | PTR RECORD | e2LD | COMPARISON TARGET CHARACTER STRING | DIVISION FOCUSING ON MANAGEMENT BOUNDARY | DIVISION FOCUSING ON CHARACTER STRING BOUNDARY |
|---|---|---|---|---|---|---|---|
| 1 | 192.0.2.1 | AS64496 | host1.example.net | example.net | host1 | SEGMENT 1-1 | SEGMENT 1-1-1 |
| 2 | 192.0.2.2 | AS64496 | host2.example.net | example.net | host2 | SEGMENT 1-1 | SEGMENT 1-1-1 |
| ... | ... | ... | ... | ... | ... | ... | ... |
| 20 | 192.0.2.20 | AS64496 | host20.example.net | example.net | host20 | SEGMENT 1-1 | SEGMENT 1-1-1 |
| 21 | 192.0.2.21 | AS64496 | test21.example.com | example.com | test21 | SEGMENT 1-2 | SEGMENT 1-2-1 |
| 22 | 192.0.2.22 | AS64496 | test22.example.com | example.com | test22 | SEGMENT 1-2 | SEGMENT 1-2-1 |
| 23 | 192.0.2.23 | AS64496 | test23.example.com | example.com | test23 | SEGMENT 1-2 | SEGMENT 1-2-1 |
| 24 | 192.0.2.24 | AS64496 | test24.example.com | example.com | test24 | SEGMENT 1-2 | SEGMENT 1-2-1 |
| 25 | 192.0.2.25 | AS64496 | test25.example.com | example.com | test25 | SEGMENT 1-2 | SEGMENT 1-2-1 |
| 26 | 192.0.2.26 | AS64496 | www.example.com | example.com | www | SEGMENT 1-2 | SEGMENT 1-2-2 |
| 27 | 192.0.2.27 | AS64496 | mail.example.com | example.com | mail | SEGMENT 1-2 | SEGMENT 1-2-3 |
| 28 | 192.0.2.28 | AS64496 | ftp.example.com | example.com | ftp | SEGMENT 1-2 | SEGMENT 1-2-4 |
| 29 | 192.0.2.29 | AS64496 | test29.example.com | example.com | test29 | SEGMENT 1-2 | SEGMENT 1-2-5 |
| ... | ... | ... | ... | ... | ... | ... | ... |
| 128 | 192.0.2.128 | AS64496 | test128.example.com | example.com | test128 | SEGMENT 1-2 | SEGMENT 1-2-5 |
| 129 | 192.0.2.129 | AS64497 | foo129.example.org | example.org | foo129 | SEGMENT 2-1 | SEGMENT 2-1-1 |
| ... | ... | ... | ... | ... | ... | ... | ... |

| SERIAL NUMBER | IP ADDRESS | AS NUMBER | PTR RECORD | e2LD | DIVISION FOCUSING ON MANAGEMENT BOUNDARY | DIVISION FOCUSING ON CHARACTER STRING BOUNDARY | TYPE |
|---|---|---|---|---|---|---|---|
| 1 | 192.0.2.1 | AS64496 | host1.example.net | example.net | SEGMENT 1-1 | SEGMENT 1-1-1 | DYNAMIC IP ADDRESS |
| 2 | 192.0.2.2 | AS64496 | host2.example.net | example.net | SEGMENT 1-1 | SEGMENT 1-1-1 | DYNAMIC IP ADDRESS |
| ... | ... | ... | ... | ... | ... | ... | ... |
| 20 | 192.0.2.20 | AS64496 | host20.example.net | example.net | SEGMENT 1-1 | SEGMENT 1-1-1 | DYNAMIC IP ADDRESS |
| 21 | 192.0.2.21 | AS64496 | test21.example.com | example.com | SEGMENT 1-2 | SEGMENT 1-2-1 | DYNAMIC IP ADDRESS |
| 22 | 192.0.2.22 | AS64496 | test22.example.com | example.com | SEGMENT 1-2 | SEGMENT 1-2-1 | DYNAMIC IP ADDRESS |
| 23 | 192.0.2.23 | AS64496 | test23.example.com | example.com | SEGMENT 1-2 | SEGMENT 1-2-1 | DYNAMIC IP ADDRESS |
| 24 | 192.0.2.24 | AS64496 | test24.example.com | example.com | SEGMENT 1-2 | SEGMENT 1-2-1 | DYNAMIC IP ADDRESS |
| 25 | 192.0.2.25 | AS64496 | test25.example.com | example.com | SEGMENT 1-2 | SEGMENT 1-2-1 | DYNAMIC IP ADDRESS |
| 26 | 192.0.2.26 | AS64496 | www.example.com | example.com | SEGMENT 1-2 | SEGMENT 1-2-2 | STATIC IP ADDRESS |
| 27 | 192.0.2.27 | AS64496 | mail.example.com | example.com | SEGMENT 1-2 | SEGMENT 1-2-3 | STATIC IP ADDRESS |
| 28 | 192.0.2.28 | AS64496 | ftp.example.com | example.com | SEGMENT 1-2 | SEGMENT 1-2-4 | STATIC IP ADDRESS |
| 29 | 192.0.2.29 | AS64496 | test29.example.com | example.com | SEGMENT 1-2 | SEGMENT 1-2-5 | DYNAMIC IP ADDRESS |
| ... | ... | ... | ... | ... | ... | ... | ... |
| 128 | 192.0.2.128 | AS64496 | test128.example.com | example.com | SEGMENT 1-2 | SEGMENT 1-2-5 | DYNAMIC IP ADDRESS |
| 129 | 192.0.2.129 | AS64497 | foo129.example.org | example.org | SEGMENT 2 | SEGMENT 2-1-1 | DYNAMIC IP ADDRESS |
| ... | ... | ... | ... | ... | ... | ... | ... |

300a: rows 1–20 (SEGMENT 1-1-1)
300b: rows 21–25 (SEGMENT 1-2-1)
300c: row 29 (SEGMENT 1-2-5)

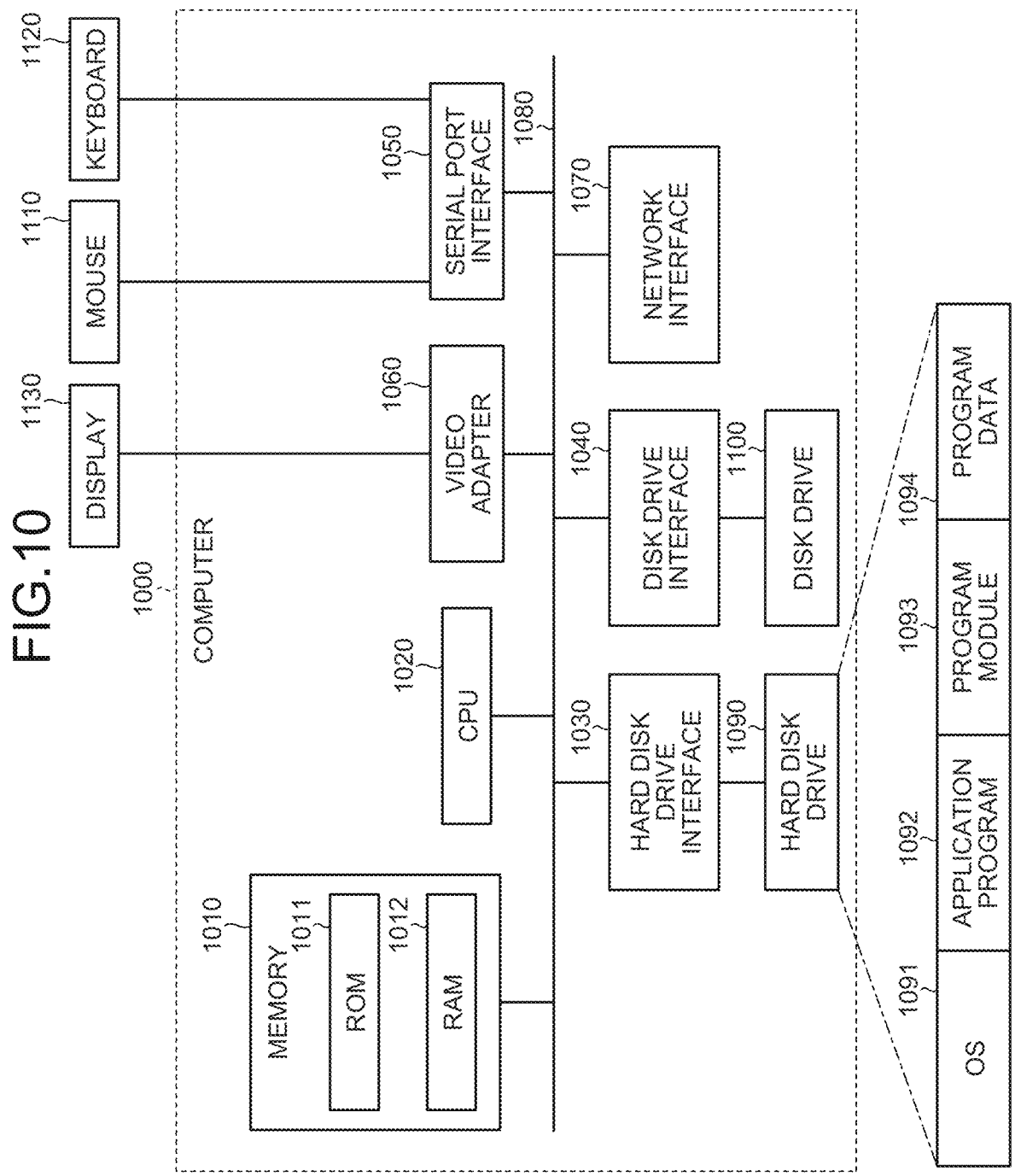

IDENTIFICATION DEVICE, IDENTIFICATION METHOD, AND IDENTIFICATION PROGRAM

CROSS-REFERENCE TO RELATED APPLICATIONS

The present application is based on PCT filing PCT/JP2019/016345, filed Apr. 16, 2019, which claims priority to JP 2018-132725, filed Jul. 12, 2018, the entire contents of each are incorporated herein by reference.

FIELD

The present invention relates to an identification device, an identification method, and an identification program.

BACKGROUND

Many of cyber attacks use malware-infected terminals, which are infected with malware. When measures against cyber attacks and malware-infected terminals are taken, internet protocol (IP) addresses are often handled as unique identifiers. Specifically, the IP addresses of malware-infected terminals are used as a blacklist or signatures in some cases, and the traffic transmitted from the IP addresses are handled as abnormal traffic in some cases. The IP address used by such a malware-infected terminal is a dynamic IP address assigned by an internet service provider (ISP) in many cases.

Herein, if a dynamic IP address is assigned to a terminal, the IP address is not permanently used by the same terminal. For example, the IP address of the terminal is changed at the timing when a point-to-point protocol over Ethernet (PPPoE) session is reconnected, power is disconnected, or a change is made by ISP.

Therefore, malware-infected terminals cannot be precisely specified with dynamic IP addresses. Therefore, a method for identifying dynamic IP addresses among IP addresses has been proposed in order to avoid using the dynamic IP addresses for specification of malware-infected terminals.

For example, there has been proposed a method in which, if a PoinTeR (PTR) record of a target IP address includes a keyword designated in advance or part or all of the numerical values of first to fourth octets of the IP address, the IP address or a /24 address block including the IP address is identified as a dynamic IP address (for example, see Non Patent Literatures 1 to 4).

CITATION LIST

Non Patent Literature

Non Patent Literature 1: Yinglian Xie, Fang Yu, Kannan Achan, Eliot Gillum, Moises Goldszmidt and Ted Wobber, "How Dynamic are IP Addresses?," in SIGCOMM'07 Proceedings of the 2007 Conference on Applications, Technologies, Architectures, and Protocols for Computer Communications, pp. 301-312, 2007.

Non Patent Literature 2: Philipp Richter, Georgios Smaragdakis, David Plonka and Arthur Berger, "Beyond Counting: New Perspectives on the Active IPv4 Address Space," in IMC'16 Proceedings of the 2016 Internet Measurement Conference, pp. 135-149, 2016.

Non Patent Literature 3: Yu Jin, Esam Sharafuddin and Zhi-Li Zhang, "Identifying Dynamic IP Address Blocks Serendipitously through Background Scanning Traffic," in CoNEXT '07 Proceedings of the 2007 ACM CoNEXT conference, 2007.

Non Patent Literature 4: Xue Cai and John Heidemann, "Understanding Block-level Address Usage in the Visible Internet," in SIGCOMM'10 Proceedings of the ACM SIGCOMM 2010 conference, pp. 99-110, 2010.

SUMMARY

Technical Problem

However, the conventional dynamic IP identifying methods are not capable of accurately identifying dynamic IP addresses in some cases. For example, if the PTR record of a dynamic IP address does not match any of designated keywords, it is difficult for the conventional methods to identify the dynamic IP address. Also, if a designated keyword is included in the PTR record of an IP address which is not a dynamic IP address, the conventional methods may erroneously identify the IP address, which is not a dynamic IP address, as a dynamic IP address.

Solution to Problem

To solve a problem and to achieve an object, an identification device includes: a specification unit configured to specify a boundary dividing a row of an IP address, which is included in an IP address block and sorted by a predetermined order, into a plurality of parts based on predetermined information about the IP address; and an identification unit configured to identify the IP address included in the part as a dynamic IP address when the part divided by the boundary satisfies a predetermined condition.

Advantageous Effects of Invention

According to the present invention, dynamic IP addresses can be accurately identified.

BRIEF DESCRIPTION OF DRAWINGS

FIG. 1 is a diagram illustrating an example of a configuration of an identification device according to a first embodiment.

FIG. 2 is a diagram illustrating an example of IP address blocks according to the first embodiment.

FIG. 3 is a diagram illustrating an example of setting information according to the first embodiment.

FIG. 4 is a diagram for describing management boundaries according to the first embodiment.

FIG. 7 is a diagram for describing character string boundaries according to the first embodiment.

FIG. 8 is a diagram for describing identification of types according to the first embodiment.

FIG. 10 is a diagram illustrating an example of a computer which executes an identification program.

DESCRIPTION OF EMBODIMENTS

Figure 5:
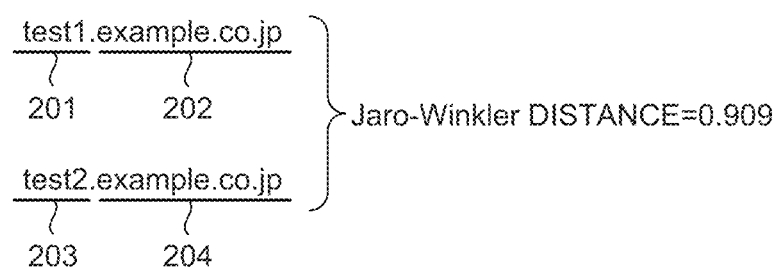
FIG. 5 is a diagram for describing a comparison method of character strings according to the first embodiment.

Hereinafter, embodiments of an identification device, an identification method, and an identification program according to the present application will be described in detail based on drawings. Note that the present invention is not limited by the embodiments described below.

Configuration of First Embodiment

First, a configuration of an identification device according to a first embodiment will be described by using FIG. 1. FIG. 1 is a diagram illustrating an example of the configuration of the identification device according to the first embodiment. As illustrated in FIG. 1, an identification device 10 has an input unit 11, an output unit 12, a storage unit 13, and a control unit 14.

The input unit 11 receives data input from a user. The input unit 11 is, for example, an input device such as a mouse or a keyboard. The output unit 12 outputs data, for example, by display on a screen. The output unit 12 is, for example, a display device such as a display. The input unit 11 and the output unit 12 may be an interface, which inputs/outputs data by communication with external devices.

The input unit 11 receives input of IP address blocks as illustrated in FIG. 2. FIG. 2 is a diagram illustrating an example of the IP address blocks according to the first embodiment. The IP address block is an aggregate of one or more IP addresses.

Herein, as illustrated in the record of a serial number 1 of FIG. 2, the IP address block is expressed like "192.0.2.0/24". The IP address block "192.0.2.0/24" includes 256 IP addresses including "192.0.2" as higher 24 bits, in other words, a first octet to a third octet and including an arbitrary value as a lower 8 bits, in other words, a fourth octet.

Returning to FIG. 1, the storage unit 13 is a storage device such as a hard disk drive (HDD), a solid state drive (SSD), or an optical disk. The storage unit 13 may be a data-rewritable semiconductor memory such as a random access memory (RAM), a flash memory, or a non volatile static random access memory (NVSRAM). The storage unit 13 stores an operating system (OS) and various programs, which are executed by the identification device 10. Furthermore, the storage unit 13 stores various information used in execution of the programs. The storage unit 13 stores setting information 131.

The storage unit 13 stores the information about IP addresses as setting information 131. Herein, the setting information 131 will be described by using FIG. 3. FIG. 3 is a diagram illustrating an example of the setting information according to the first embodiment. The setting information 131 is stored in the storage unit 13 manually or automatically before identification processing of dynamic IP addresses is carried out. For example, the setting information 131 may be acquired from a secure sockets layer (SSL) server certificate.

As illustrated in FIG. 3, the setting information 131 includes items such as serial numbers, IP addresses, AS numbers, PTR records, and effective second level domains (e2LDs). The serial numbers are the numbers for identifying respective records. The PTR records are reverse lookup records of domain name system (DNS) and represent host names for the IP addresses. The e2LDs are top level domain names and second level domain names included in the PTR records.

The record of the serial number 26 of FIG. 3 represents that the AS number of the IP address "192.0.2.26" is "AS64496", the PTR record is "www.example.com", and the e2LD is "example.com".

Returning to FIG. 1, the control unit 14 controls the entire identification device 10. The control unit 14 is, for example, an electronic circuit such as a central processing unit (CPU) or a micro processing unit (MPU) or an integrated circuit such as an application specific integrated circuit (ASIC) or a field programmable gate array (FPGA). The control unit 14 has an internal memory for storing programs, which define various processing procedures, and control data and executes processing by using the internal memory. The control unit 14 functions as various processing units when the various programs work. For example, the control unit 14 has a specification unit 141 and an identification unit 142.

Based on the setting information 131, the specification unit 141 specifies boundaries which divide rows of IP addresses sorted in a predetermined order, which are IP addresses included in IP address blocks input to the input unit 11, into a plurality of parts. For example, as illustrated in FIG. 4, the specification unit 141 specifies a position 100a and a position 100b as boundaries. The setting information 131 is an example of predetermined information about IP addresses. The part referred to herein is part of the IP addresses included in the input IP address blocks and is an aggregate of the IP addresses maintaining the order and continuity of the sorted rows.

As illustrated in FIG. 4, first, the specification unit 141 sorts the IP addresses by the predetermined order. FIG. 4 is a diagram for describing management boundaries according to the first embodiment. According to the present embodiment, the specification unit 141 uses the values of respective octets of the IP addresses considered as numerical values as keys and carries out sorting by the magnitude relation of the keys. In the example of FIG. 4, the IP addresses are sorted in the ascending order of the keys.

For example, the specification unit 141 compares first information about a first IP address with second information about a second IP address, which is subsequent to the first IP address in the order of rows, and, if the similarity between the first information and the second information is equal to or less than a threshold value, specifies the position between the first IP address and the second IP address as a boundary. In other words, the specification unit 141 compares the values of predetermined items of two records which have continuous serial numbers in FIG. 4 and, if the similarity thereof is equal to or less than a predetermined value, specifies the position between the two continuous records as a boundary. The cases in which the similarity between the two comparison targets is equal to or less than the predetermined value include the cases in which the two comparison targets do not completely match.

Specifically, the specification unit 141 specifies the boundary based on the information with which whether the IP addresses have the same administrator or operator or not can be specified. In the present embodiment, if the AS numbers or e2LDs are different between two IP addresses, the specification unit 141 determines that the administrator or the operator of the two IP addresses are different from each other.

For example, since the AS numbers are different between the records having serial numbers 1 to 128 and the records having serial numbers 129 or higher in FIG. 4, the specification unit 141 specifies a position 100b between the record of the serial number 128 and the record of the serial number 129 as a boundary. In this case, the records before the position 100b and the records after the position 100b are divided into segments 1 and segments 2, respectively.

Furthermore, since e2LDs are different between the records of the serial numbers 1 to 20 and the records of the serial numbers 21 and higher among the records of the segment 1, the specification unit 141 specifies the position 100a between the record of the serial number 20 and the record of the serial number 21 as a boundary. In this case, the records before the position 100a and the records after the position 100a in the segment 1 are denoted by branch numbers and divided into segments 1-1 and segments 1-2, respectively.

Furthermore, the specification unit 141 specifies boundaries based on the similarity of predetermined character strings included in predetermined information. Specifically, if the Jaro-Winkler distance (Reference Literature 1: William E. Winkler, "String Comparator Metrics and Enhanced Decision Rules in the Fellegi-Sunter Model of Record Linkage," Proceedings of the Section on Survey Research Methods, in American Statistical Association, pp. 354-359, 1990) between a first character string, which is the host name of the first IP address excluding e2LD, and a second character string, which is the host name of the second IP address, which is subsequent to the first IP address in the order of the rows, excluding e2LD, is equal to or lower than a threshold value, the specification unit 141 specifies the position between the first IP address and the second IP address as a boundary. Herein, in the present embodiment, the host names are the PTR records.

Figure 6:
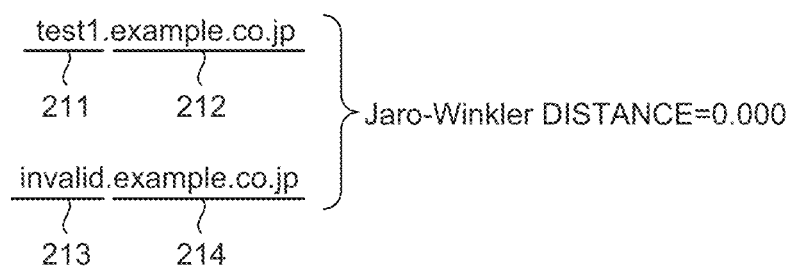
FIG. 6 is a diagram for describing a comparison method of character strings according to the first embodiment.

A comparison method of the character strings by the specification unit 141 will be described by using FIG. 5 and FIG. 6. FIG. 5 and FIG. 6 are diagrams for describing the comparison method of the character strings according to the first embodiment. First, as illustrated in FIG. 5, a PTR record "test1.example.co.jp" includes a comparison-target character string 201 and an e2LD 202. A PTR record "test2.example.co.jp" includes a comparison-target character string 203 and an e2LD 204. In this case, the specification unit 141 calculates the Jaro-Winkler distance between the comparison-target character string 201 and the comparison-target character string 203 as 0.909.

As illustrated in FIG. 6, a PTR record "test1.example.co.jp" includes a comparison-target character string 211 and an e2LD 212. A PTR record "invalid.example.co.jp" includes a comparison-target character string 213 and an e2LD 214. In this case, the specification unit 141 calculates the Jaro-Winkler distance between the comparison-target character string 211 and the comparison-target character string 213 as 0.000.

In this case, as illustrated in FIG. 7, the specification unit 141 specifies a position 200a, a position 200b, a position 200c, a position 200d, a position 200e, and a position 200f as boundaries based on the Jaro-Winkler distances. FIG. 7 is a diagram for describing character string boundaries according to the first embodiment.

For example, since the Jaro-Winkler distance between the record of a serial number 20 of FIG. 7 and the record of a serial number 21 in FIG. 7 is equal to or less than the threshold value, the specification unit 141 specifies a position 200a between the record of the serial number 20 and the record of the serial number 21 as a boundary. In this case, the records before the position 200a and the records after the position 200a in segments 1-1 are further denoted by branch numbers and divided into segments 1-1-1 and segments 1-2-1, respectively.

Herein, the Jaro-Winkler distance is an index which becomes 1 if two character strings completely match and becomes 0 if they do not match at all, and the Jaro-Winkler distance is defined based on a Jaro distance. The specification unit 141 calculates the Jaro distance $\Phi$ as Equation (1). The specification unit 141 calculates the Jaro-Winkler distance $\Phi_n$ as Equation (2).

$$\phi = W_1 \cdot \frac{c}{d} + W_2 \frac{c}{r} + W_\tau \cdot \frac{(c-\tau)}{c} \quad (1)$$

$W_1$: The number of characters of common prefix
$W_2$: The weight on the characters of a second character string
$W_\tau$: The weight on replacement of characters
d: The length of a first character string
r: The length of the second character string
$\tau$: Replaced character string $c$: The number of matched characters when the positions of two characters are within $\frac{\max(d, r)}{2}$ $$\phi_n = \phi + i \cdot 0.1 \cdot (1-\phi) \quad (2)$$

i: The number of characters of common prefix

For example, "test1" and "test2" of FIG. 5 are different only by the one-digit number subsequent to the prefix "test". Therefore, the Jaro-Winkler distance between "test1" and "test2" is 0.909, which is an extremely large value. On the other hand, "test1" and "invalid" of FIG. 6 do not contain matching characters at all, and the Jaro-Winkler distance thereof is therefore 0.000.

For example, if the threshold value of the Jaro-Winkler distance is 0.9000, the combinations in the example of FIG. 7 for which the Jaro-Winkler distances of the character strings of comparison targets conceivably become equal to or less than the threshold value are, for example, the serial number 25 and the serial number 26, the serial number 20 and the serial number 27, the serial number 20 and the serial number 28, the serial number 20 and the serial number 29, and the serial number 128 and the serial number 129. On the other hand, the Jaro-Winkler distances of the character strings of comparison targets conceivably become larger than the threshold value in the ranges including, for example, the serial number 1 to the serial number 20 and the serial number 21 to the serial number 25.

Herein, in general, a network operator or an administrator of ISP, etc. collectively sets continuous IP addresses as dynamic IP addresses in many cases. For the sake of improving convenience in management or operation, in many cases, character strings which are combinations of a common prefix and numerical values, which are different among IP addresses, are set in the PTR records of the continuous IP addresses which are set collectively. For example, the PTR records of the serial number 1 to the serial number 20 in FIG. 7 are combinations of a common prefix "host" with numbers. The Jaro-Winkler distances between the comparison-target character strings of such PTR records, which have a common prefix part and are different only by the number part, tend to become large.

Returning to FIG. 1, if the part divided by the boundary satisfies a predetermined condition, the identification unit 142 identifies the IP addresses included in the part as dynamic IP addresses. For example, if the number of IP addresses included in the part divided by the boundary is equal to or higher than a threshold value, the identification unit 142 identifies the IP addresses included in the part as dynamic IP addresses.

As illustrated in FIG. 8, the identification unit 142 identifies a part 300a, a part 300b, and a part 300c as dynamic IP addresses among the parts in which segments divided by boundaries match. FIG. 8 is a diagram for describing identification of types according to the first embodiment. For example, the identification unit 142 identifies the part in which the number of included IP addresses is equal to or more than a parameter N, which can be arbitrarily set, as dynamic IP addresses. In this case, if N=5, the identification unit 142 identifies the part 300b as dynamic IP addresses since the number of the IP addresses included in the part 300b corresponding to segments 1-2-1 is 5.

The parameter N used in identification may be determined in advance by using IP address blocks, which are obviously static IP addresses or dynamic IP addresses, as training data. The parameter N may be determined by an administrator or may be automatically determined by the identification device 10.

Herein, an example of a case in which the identification device 10 determines the parameter N will be described. With respect to IP address blocks which are known whether they are dynamic IP addresses or not, the identification device 10 executes identification processing by the identification device 10 while the value of N is incremented from 1. Then, the identification device 10 calculates the sum of the number of static IP addresses erroneously identified as dynamic IP addresses and the number of dynamic IP addresses erroneously identified as static IP addresses. In this process, the identification device 10 employs the value of N that minimizes the calculated sum.

Processing of First Embodiment

Figure 9:
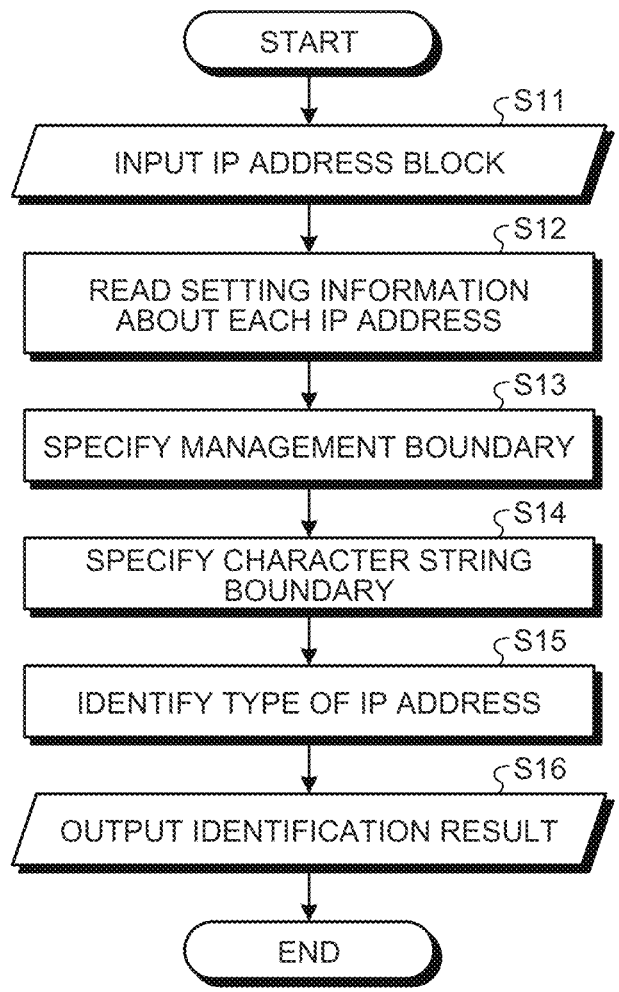
FIG. 9 is a flow chart illustrating a processing flow of the identification device according to the first embodiment.

A processing flow of the identification device 10 will be described by using FIG. 9. FIG. 9 is a flow chart illustrating a processing flow of the identification device according to the first embodiment. As illustrated in FIG. 9, first, the identification device 10 receives input of an IP address block (step S11).

Then, the identification device 10 reads the setting information 131, which corresponds to IP addresses included in the received IP address block, from the storage unit 13 (step S12). Then, the identification device 10 specifies a management boundary based on the setting information 131 (step S13). Herein, the management boundary is the boundary which is specified based on the information with which whether the IP addresses have the same administrator or operator or not can be specified. For example, the management boundary is the position before/after which the AS numbers or e2LDs of the sorted rows of the IP addresses are different.

Then, the identification device 10 specifies a character string boundary based on the setting information 131 (step S14). The character string boundary is the boundary specified based on the similarity of predetermined character strings. For example, the character string boundary is the position at which the Jaro-Winkler distance of the e2LD-excluding parts of the PTR records of the IP addresses, which are sequential in the sorted row of the IP addresses, becomes equal to or less than a threshold value.

The identification device 10 identifies the types of the IP addresses based on the management boundaries and the character string boundaries (step S15). For example, the types of the IP addresses are static IP addresses and dynamic IP addresses. If the number of the IP addresses included in the part of the sorted rows of the IP addresses divided by the management boundaries and the character string boundaries is equal to or higher than the threshold value, the identification device 10 identifies this part as dynamic IP addresses.

Then, the identification device 10 outputs identification results (step S16). For example, as the identification results, the identification device 10 outputs a list of the IP addresses which have been identified as dynamic IP addresses.

Effects of First Embodiment

As described above, the identification device 10 of the present embodiment specifies the boundaries which divide the rows of IP addresses, which are the IP addresses included in the IP address block and sorted in the predetermined order, into a plurality of parts based on predetermined information about IP addresses. If the part divided by the boundaries satisfy the predetermined condition, the identification unit 142 identifies the IP addresses, which are included in the part, as dynamic IP addresses. In this manner, the identification device 10 of the present embodiment identifies dynamic IP addresses without using specific keywords. Therefore, according to the identification device 10, dynamic IP addresses can be accurately identified.

For example, if the parts 300a, 300b, and 300c in FIG. 8 are to be identified as dynamic IP addresses by using a conventional method, keywords such as "host" and "test" have to be designated in advance. If such keywords are not designated in advance, it is difficult for conventional methods to identify dynamic IP addresses at the accuracy that is equivalent to or better than the present embodiment. It is not realistic to cover all the keywords which are used in the PTR records of dynamic IP addresses. Therefore, according to the method of the present embodiment, dynamic IP addresses can be easily and accurately identified compared with conventional methods.

The identification device 10 compares first information about a first IP address with second information about a second IP address, which is subsequent to the first IP address in the order of rows, and, if the similarity between the first information and the second information is equal to or less than a threshold value, specifies the position between the first IP address and the second IP address as a boundary. In this manner, the identification device 10 specifies boundaries by focusing on the combinations of IP addresses, which are continuous in the order. Therefore, the identification device 10 does not have to evaluate all the combinations of IP addresses, and boundaries can be efficiently specified.

The identification device 10 specifies boundaries based on the information with which whether the IP addresses have the same administrator or operator or not can be specified. Therefore, the identification device 10 can specify the dynamic IP addresses which are collectively managed by the same administrator or operator.

The identification device 10 specifies boundaries based on the similarity of predetermined character strings included in predetermined information. Therefore, the identification device 10 can specify the dynamic IP addresses which use a common prefix in PTR records.

If the Jaro-Winkler distance between the first character string excluding the e2LD from the host name of the first IP address and the second character string excluding the e2LD from the host name of the second IP address, which is subsequent to the first IP address in the order of the rows, is equal to or lower than the threshold value, the identification device 10 specifies the position between the first IP address and the second IP address as a boundary. In this manner, the identification device 10 can specify dynamic IP addresses by focusing on the part which highly possibly uses a common prefix in PTR records.

If the number of IP addresses included in the part divided by boundaries is equal to or higher than a threshold value, the identification device 10 identifies the IP addresses included in the part as dynamic IP addresses. There is a tendency that the larger the number of the IP addresses in the segment, the higher the possibility that they are dynamic IP addresses. The identification device 10 can accurately identify dynamic IP addresses by using such a tendency.

OTHER EMBODIMENTS

In the above described embodiment, the example of the case in which the IP addresses, which are identification targets of the identification device 10, are IPv4 has been described. On the other hand, the IP addresses of the identification targets of the identification device 10 may be IPv6. Even if the IP addresses are IPv6, as well as the above described embodiment, the identification device 10 can carry out sorting by using the value of each sectioned part, which is considered as a numerical value, as a key.

In the above described embodiment, the example of the case in which the similarity between the character strings is evaluated by the Jaro-Winkler distance has been described. On the other hand, the identification device 10 may evaluate the similarity between the character strings by using an index other than the Jaro-Winkler distance. For example, the identification device 10 can use the number or rate of the matching characters in the front side of two character strings as the similarity between the character strings.

[System Configuration, etc.]

The constituent elements of the illustrated devices are functionally conceptual and are not necessarily required to be physically formed like the illustration. In other words, specific modes of distribution and integration of the devices are not limited to the illustration, but all or part thereof may be functionally or physically configured to be distributed or integrated in arbitrary units depending on various loads, usage conditions, etc. Furthermore, all or arbitrary part of the processing functions carried out in the devices may be realized by a CPU and a program(s) analyzed and executed by the CPU or may be realized as hardware by wired logic.

Among the processings described in the present embodiment, all or part of the processing described to be automatically carried out may be manually carried out, or all or part of the processing described to be manually carried out may be automatically carried out by a publicly known method. Other than that, processing procedures, control procedures, specific names, various data, and information including parameters described in the above described document or drawings may be arbitrarily changed unless otherwise specifically stated.

[Program]

As an embodiment, the identification device 10 can be implemented by installing an identification program serving as packaged software or online software, which executes the above described identification processing, in a desired computer. For example, an information processing device can be caused to function as the identification device 10 by executing the above described identification program by the information processing device. The information processing device referred to herein includes a personal computer of a desktop type or a laptop type. Also, other than that, for example, smartphones, mobile communication terminals such as portable phones and personal handy-phone systems (PHSs), and slate terminals such as personal digital assistants (PDAs) fall within the category of the information processing device.

Also, the identification device 10 can be implemented as an identification server device which uses a terminal device used by a user as a client and provides a service, which is related to the above described identification processing, to the client. For example, the identification server device is implemented as a server device which provides an identification service which uses an IP address block as input and outputs a list of dynamic IP addresses. In this case, the identification server device may be implemented as a Web server or a cloud which provides a service related to the above described identification processing by outsourcing.

FIG. 10 is a diagram illustrating an example of a computer which executes the identification program. A computer 1000 has, for example, a memory 1010 and a CPU 1020. The computer 1000 has a hard disk drive interface 1030, a disk drive interface 1040, a serial port interface 1050, a video adapter 1060, and a network interface 1070. These units are connected by a bus 1080.

The memory 1010 includes a read only memory (ROM) 1011 and a RAM 1012. The ROM 1011 stores, for example, a boot program of, for example, a basic input output system (BIOS). The hard disk drive interface 1030 is connected to a hard disk drive 1090. The disk drive interface 1040 is connected to a disk drive 1100. For example, an attachable/detachable storage medium such as a magnetic disk or an optical disk is inserted in the disk drive 1100. The serial port interface 1050 is connected to, for example, a mouse 1110 and a keyboard 1120. The video adapter 1060 is connected to, for example, a display 1130.

The hard disk drive 1090 stores, for example, an OS 1091, an application program 1092, a program module 1093, and program data 1094. More specifically, the program which defines the processings of the identification device 10 is implemented as the program module 1093, in which computer-executable codes are described. The program module 1093 is stored, for example, in the hard disk drive 1090. For example, the program module 1093 for executing the processings which are similar to the functional configuration of the identification device 10 is stored in the hard disk drive 1090. Note that the hard disk drive 1090 may be replaced by a SSD.

Also, setting data used in the processings of the above described embodiments is stored as the program data 1094, for example, in the memory 1010 or in the hard disk drive 1090. Then, in accordance with needs, the CPU 1020 reads the program module 1093 and/or the program data 1094, which is stored in the memory 1010 or the hard disk drive 1090, to the RAM 1012 and executes the processing of the above described embodiment.

Note that the program module 1093 and the program data 1094 is not limited to be stored in the hard disk drive 1090, but may be stored, for example, in an attachable/detachable storage medium and read by the CPU 1020 via the disk drive 1100 or the like. Alternatively, the program module 1093 and the program data 1094 may be stored in another computer connected via a network (local area network (LAN), wide area network (WAN), or the like).

Then, the program module 1093 and the program data 1094 may be read from the other computer by the CPU 1020 via the network interface 1070.

REFERENCE SIGNS LIST

10 IDENTIFICATION DEVICE
11 INPUT UNIT
12 OUTPUT UNIT
13 STORAGE UNIT
14 CONTROL UNIT
131 SETTING INFORMATION
141 SPECIFICATION UNIT
142 IDENTIFICATION UNIT

The invention claimed is:

1. An identification device comprising: a memory; and a processor coupled to the memory and programmed to execute a process comprising:
   specifying a boundary dividing a row of an IP address, which is included in an IP address block and sorted by a predetermined order, into a plurality of parts based on predetermined information about the IP address; and
   identifying the IP address included in the part as a dynamic IP address when the part divided by the boundary satisfies a predetermined condition, wherein
   the specifying specifies the boundary based on a similarity of a predetermined character string included in the predetermined information.

2. The identification device according to claim 1, wherein the specifying compares first information about a first IP address and second information about a second IP address, which is subsequent to the first IP address in the order of the row, and, when a similarity between the first information and the second information is equal to or less than a threshold value, specifies a position between the first IP address and the second IP address as the boundary.

3. The identification device according to claim 1, wherein the specifying specifies the boundary based also on information with which whether the IP address has a same administrator or operator can be specified.

4. The identification device according to claim 3, wherein said specifying the boundary comprises specifying the boundary in response to a determination that the first IP address and the second IP address have different administrators or operators.

5. The identification device according to claim 1, wherein, when a Jaro-Winkler distance between a first character string excluding an effective second level domain (e2LD) from a host name of a first IP address and a second character string excluding an e2LD from a host name of a second IP address, which is subsequent to the first IP address in the order of the row, is equal to or less than a threshold value, the specifying specifies a position between the first IP address and the second IP address as the boundary.

6. The identification device according to claim 1, wherein, when the number of the IP address included in the part divided by the boundary is equal to or higher than a threshold value, the identifying identifies the IP address included in the part as the dynamic IP address.

7. The identification device according to claim 1, wherein said specifying the boundary is performed in accordance with a similarity between a host name of a first IP address and a host name of a second IP address.

8. The identification device according to claim 7, wherein the similarity is determined between a portion of the host name of the first IP address excluding an effective second level domain (e2LD) of the first IP address and a portion of the host name of the second IP address excluding an e2LD of the second IP address.

9. The identification device according to claim 8, wherein the similarity is determined in accordance with a number of matching characters between the portion of the host name of the first IP address excluding the e2LD of the first IP address and portion of the host name of the second IP address excluding the e2LD of the second IP address.

10. An identification method executed by a computer, the identification method including:
    specifying a boundary dividing a row of an IP address, which is included in an IP address block and sorted by a predetermined order, into a plurality of parts based on predetermined information about the IP address; and
    identifying the IP address included in the part as a dynamic IP address when the part divided by the boundary satisfies a predetermined condition, wherein
    the specifying specifies the boundary based on a similarity of a predetermined character string included in the predetermined information.

11. A non-transitory computer-readable recording medium having stored a program for identification that causes a computer to execute a process comprising:
    specifying a boundary dividing a row of an IP address, which is included in an IP address block and sorted by a predetermined order, into a plurality of parts based on predetermined information about the IP address; and
    identifying the IP address included in the part as a dynamic IP address when the part divided by the boundary satisfies a predetermined condition, wherein
    the specifying specifies the boundary based on a similarity of a predetermined character string included in the predetermined information.

* * * * *